United States Patent

Gautheron

[11] Patent Number: 5,865,429
[45] Date of Patent: Feb. 2, 1999

[54] ELASTIC SUPPORT INCLUDING AT LEAST TWO CYLINDRICAL SLEEVES WITH FOLDS

[75] Inventor: Michel Gautheron, Nevers, France

[73] Assignee: Caoutchouc Manufacture et Plastiques, Versailles, France

[21] Appl. No.: 902,282

[22] Filed: Jul. 29, 1997

Related U.S. Application Data

[63] Continuation of Ser. No. 556,897, filed as PCT/FR95/00645 May 17, 1995, abandoned.

[30] Foreign Application Priority Data

May 18, 1994 [FR] France ................................. 94/06159

[51] Int. Cl.⁶ ........................................................ F16F 7/00
[52] U.S. Cl. ................................ 267/141.7; 267/141.2; 267/293
[58] Field of Search .............................. 267/141.2–141.4, 267/141.6, 141.7, 292, 293; 180/312

[56] References Cited

U.S. PATENT DOCUMENTS

| | | |
|---|---|---|
| 2,048,256 | 7/1936 | Geyer . |
| 2,509,145 | 5/1950 | Henshaw . |
| 2,621,923 | 12/1952 | Krotz . |

FOREIGN PATENT DOCUMENTS

| | | |
|---|---|---|
| 0 009 120 | 4/1980 | European Pat. Off. . |
| 0 132 502 | 2/1985 | European Pat. Off. . |
| 0 499 996 | 8/1992 | European Pat. Off. . |
| 0 529 629 | 3/1993 | European Pat. Off. . |
| 680 434 | 4/1930 | France . |
| 1 659 989 | 7/1953 | Germany . |
| 91 12 268 | 1/1992 | Germany . |
| 43 09 425 | 6/1994 | Germany . |
| 8-1249 | 5/1983 | Japan . |
| 60-256637 | 12/1985 | Japan . |
| 2-113137 | 4/1990 | Japan . |
| 816311 | 8/1959 | United Kingdom . |
| 869368 | 5/1961 | United Kingdom . |

*Primary Examiner*—Peter M. Poon
*Attorney, Agent, or Firm*—Young & Thompson

[57] ABSTRACT

Elastic support including at least two coaxial cylindrical sleeves (10, 20) linked together by an elastic material (3) in compression, the compression of the elastic material (3) being obtained by modifying the length of the midline of the cross section of one of said sleeves (10) in the direction which brings radially closer together the midlines of the cross sections of the two adjacent sleeves (10, 20); the sleeve (10) whose midline is modified has prepositioned longitudinal folds (11) uniformly distributed on the periphery.

8 Claims, 3 Drawing Sheets

ELASTIC SUPPORT INCLUDING AT LEAST TWO CYLINDRICAL SLEEVES WITH FOLDS

This application is a continuation of application Ser. No. 08/556,897, filed Nov. 28, 1995, now abandoned, which was the 35 U.S.C. §371 national phase of International application PCT/FR95/00645 filed on May 17, 1995, which designated the United States.

The invention relates to an elastic support including at least two cylindrical sleeves linked together by an elastic material.

More precisely, the invention relates to an elastic support including two cylindrical sleeves, having parallel axes, linked together by an elastic material in compression, the compression of the elastic material having been obtained by modifying the length of the midline of the cross section of at least one of said sleeves in the direction which brings radially closer together the midlines of the cross sections of two adjacent sleeves; as is known, this is because, in its function of damping vibrations, the elastic material, generally rubber, works preferentially in compression rather than in tension. Such an elastic support finds many applications in mechanical engineering, such as for example in producing articulated connecting rods, especially for motor vehicles, one of the connecting rods being connected to one sleeve and the other to the other sleeve.

FIG. 1 represents, in perspective, an elastic support of this type, which includes an outer cylindrical sleeve 1 and an inner cylindrical sleeve 2, these being coaxial and metallic, here having circular cross sections; disposed between the two sleeves 1 and 2 is an elastic substance 3, such as rubber, fastened by adhesive bonding 4 to the internal surface of the outer sleeve 1 and to the external surface of the inner sleeve 2. In order to form such an elastic support, the process starts with two sleeves 1 and 2, on which an adhesive 4 dissolved in a solvent is deposited, for example by spraying; after the solvent has evaporated and the adhesive 4 dried, the two sleeves 1 and 2 are deposited coaxially in a molding machine for installation, by molding, of the rubber 3 between the two sleeves 1 and 2; the thermal conditions under which the molding of the rubber 3 is carried out allow a bonding proper by the adhesive 4 to the rubber 3.

In order to produce the elastic support, it is necessary to put the rubber 3 into compression; this operation is carried out mechanically by modifying the length of the midline of the cross section of at least one of said sleeves, most often the outer sleeve 1, this modification of the midline being in this case a reduction in the length of the latter. FIG. 2 illustrates diagrammatically the most commonly employed method: the elastic support, produced as described hereinabove, is forcibly inserted into the bore 9 of a die 8 of frustoconical shape; after passing through the die 8, the external diameter 6 of the outer sleeve 1 is less than the external diameter 5 which it had before insertion into the die, this reduction in diameter putting the rubber 3 into compression. However, it turns out that this reduction in diameter, if it is large, is accompanied by an uncontrolled deformation of the metal and leads most of the time to deterioration of the bonding; the only way of avoiding this drawback is to limit the reduction in diameter of the sleeve 1. The angle 7 of the conical bore 9 of the die 8, that is to say the half-angle at the vertex of the corresponding cone, therefore does not exceed, in general, two degrees and the reduction in diameter is, in practice, limited to five percent. However, as is known, a shrinkage phenomenon occurs in the rubber 3 due to its vulcanization; the reduction in diameter must therefore compensate for this shrinkage before it becomes possible to compress the rubber; it is therefore understood that a limitation in shrinkage to a few percent leads to the production of an elastic support whose effectiveness is limited, the rubber 3 being insufficiently compressed. Instead of the die 8, a gripping chuck having circumferentially spaced longitudinal sectors has also been used, especially for producing elastic supports having a noncircular, for example polygonal, cross section, but the drawbacks mentioned hereinabove are the same.

The subject of the present invention is an elastic support in which the elastic material is put into compression to a greater extent than that known hitherto, the reduction in diameter mentioned with regard to the above example possibly being as high as twenty percent instead of five percent, and this being so without deterioration of the bonding.

Thus, according to the invention, an elastic support including at least two cylindrical sleeves, having parallel axes, linked together by an elastic material in compression, the compression of the elastic material being obtained by modifying the length of the midline of the cross section of at least one of said sleeves in the direction which brings radially closer together the midlines of the cross sections of two adjacent sleeves, is characterized by the fact that the sleeve whose midline is modified has prepositioned longitudinal folds uniformly distributed on the periphery.

According to one embodiment, the elastic support includes two cylindrical sleeves, one the outer one and the other the inner one, the sleeve whose midline is modified being the outer sleeve, the longitudinal folds being pushed-in folds; preferably, the elastic material is bonded to the internal surface of the outer sleeve only in regions other than those which are located in line with said pushed-in folds and in the vicinity of the latter.

According to another embodiment, the elastic support includes two cylindrical sleeves, one the outer one and the other the inner one, the sleeve whose midline is modified being the inner sleeve, the longitudinal folds being pushed-out folds; preferably, the elastic material is bonded to the external surface of the inner sleeve only in regions other than those which are located in line with said pushed-out folds.

Advantageously, the cross section of at least one of the sleeves is circular; it is also possible for the cross section of at least one of the sleeves to be polygonal.

According to a variant, the elastic support includes an intermediate sleeve having the same axis as the outer and inner sleeves, the elastic material being disposed between, on the one hand, the intermediate sleeve and, on the other hand, each of the outer and inner sleeves and furthermore being adhesively bonded to the internal and external surfaces of the intermediate sleeve.

The subject of the invention is also an outer cylindrical sleeve, intended to interact with an inner cylindrical sleeve having a parallel axis, in order to retain an elastic material between them for the purpose of producing an elastic support, said outer cylindrical sleeve including reentrant longitudinal folds uniformly distributed on the periphery, the rigidity of the folding being capable of keeping the elastic material in compression.

The subject of the invention is also an inner cylindrical sleeve, intended to interact with an outer cylindrical sleeve having a parallel axis, in order to retain an elastic material in compression between them for the purpose of producing an elastic support, said inner cylindrical sleeve including projecting longitudinal folds uniformly distributed on the periphery.

The subject of the invention is also a process for manufacturing an elastic support including at least two cylindrical sleeves having parallel axes, linked together by an elastic material of the above kind, this process consisting in modifying the length of the midline of the cross section of at least one of the sleeves by bringing radially closer together the midlines of the cross sections of two adjacent sleeves.

When the elastic support includes two cylindrical sleeves, one the inner one and the other the outer one, the manufacturing process consists in reducing, by compression, the length of the midline of the cross section of the outer sleeve and/or in increasing, by a tube-expansion operation, the length of the midline of the cross section of the inner sleeve.

In order to make the subject of the invention better understood, a description will now be given, by way of purely illustrative and non-limiting example, of four embodiments thereof, these embodiments being represented in the appended drawing.

Figure 3:
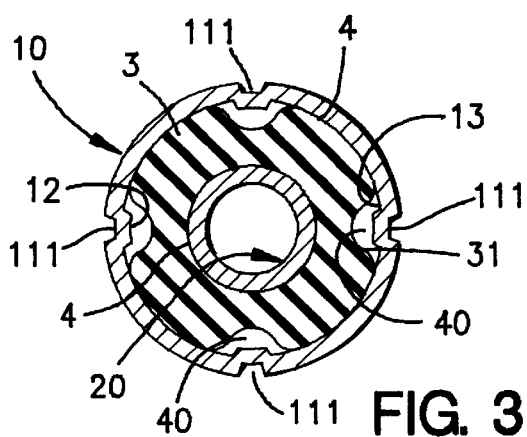
FIGS. 3 and 4 are cross-sectional view of an elastic support according to the invention, respectively before, FIG. 3, and after, FIG. 4, putting the elastic material into compression, this putting into compression being achieved by decreasing the length of the midline of the cross section of the outer sleeve.

Referring to FIG. 3, it may be seen that, in order to produce an elastic support in accordance with the present invention, the process starts with a cylindrical metal inner sleeve 20, here having a cross section of circular general shape, whose external surface is coated with an adhesive 4 which is dry after evaporation of the solvent which served for depositing said adhesive 4 by spraying. The inner sleeve 20 is surrounded concentrically by a cylindrical metal outer sleeve 10, having a circular cross section. The wall of the outer sleeve 10 includes reentrant longitudinal folds 111 which are, in fact, initiators for larger folds, as will be described hereinbelow; these folds 111, or fold initiators, may be produced by machining, stamping, deep-drawing, drawing or die-forming. The cross section of the wall of the outer sleeve 10 in line with the folds 111 may be of a quadrilateral or trapezoidal general shape, with sharp or rounded edges. The folds 111 are uniformly distributed on the periphery of the outer sleeve 10; according to the example represented, there are four folds 111 disposed at ninety degrees to one another.

The two sleeves 10 and 20 are deposited coaxially in a molding machine for installing, by molding, the rubber 3 between the two sleeves 10 and 20: prior to molding, regions 40 are blanked off, for example by using sliding shutters provided in the molding machine. These regions 40 are located inside the sleeve 10 in line with 12 the reentrant folds 111 and in their vicinity 13, so that, when the rubber 3 is molded between the sleeves 10 and 20, there is no rubber in these regions 40, as shown in FIG. 3.

Figure 1:
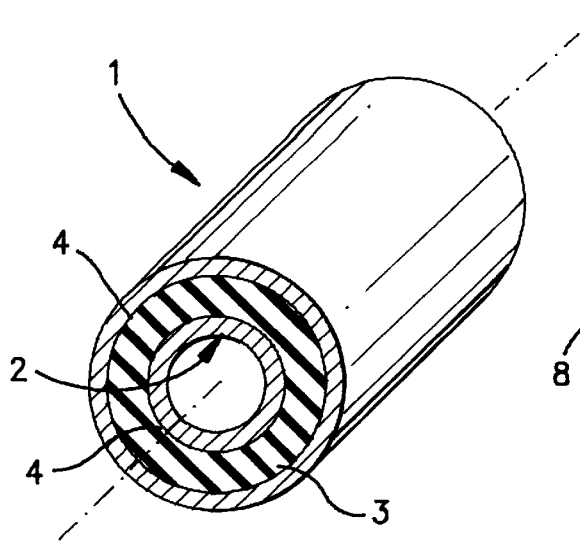
FIG. 1 represents, in perspective, an elastic support of the prior art.
Figure 2:
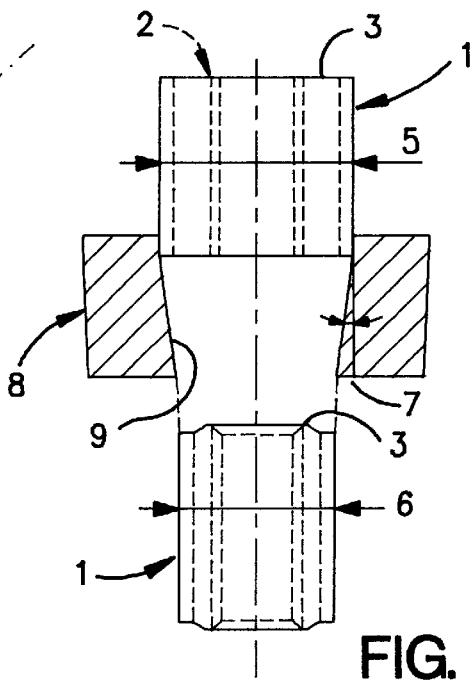
FIG. 2 illustrates diagrammatically a known process for producing the elastic support of FIG. 1.
Figure 4:
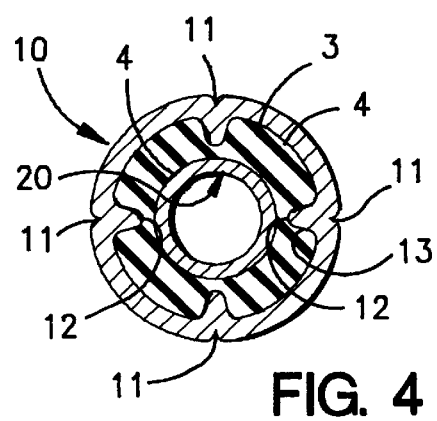

In order to complete the elastic support, the assembly which has just been described is forcibly inserted into a die of frustoconical shape, such as the die 8 in FIG. 2, which leads to a reduction in the length of the midline of the cross section of the sleeve 10, that is to say a reduction in the diameter of the sleeve 10. By virtue of the folds 111 uniformly distributed on the circumference of the sleeve 10, this reduction in diameter is performed symmetrically, the folds 111 being accentuated during this operation until they become pushed-in folds 11, the sides of which are touching, as shown in FIG. 4, but they could be non-touching. Because of the blanked-off regions 40 provided during the molding of the rubber, the surface region 31 of the latter, which faces the parts 12, 13 of the internal surface of the sleeve 10, is not bonded to the sleeve 10 and there is therefore no deterioration of the bonding in these very highly mechanically stressed regions during the operation of reducing the diameter which may be conducted with a high reduction ratio, which may be as high as twenty percent.

Figure 5:
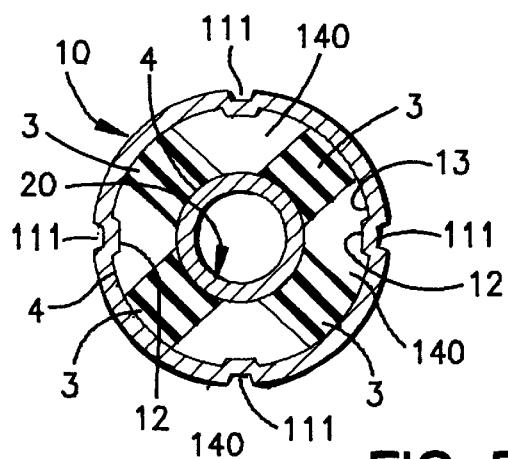
FIGS. 5 and 6 are similar to FIGS. 3 and 4 and represent a variant.
Figure 6:
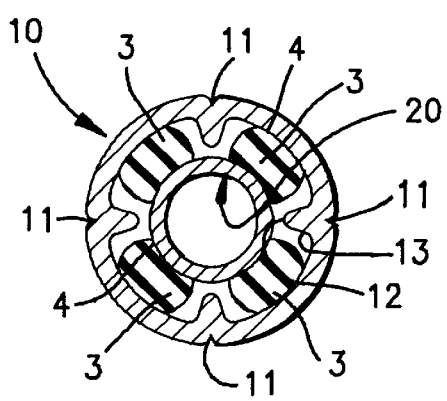

FIGS. 5 and 6 are similar to FIGS. 3 and 4 respectively, but relate to a variant according to which the blanked-off regions 140 are larger, the rubber 3 not completely surrounding the inner sleeve 20: the rubber 3 is in the form of a plurality of radial arms, in this case four radial arms.

Figure 7:
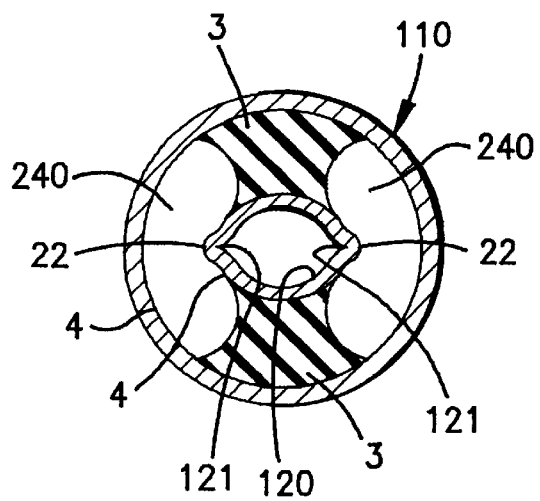
FIGS. 7 and 8 are cross-sectional views of an elastic support according to the invention, respectively before, FIG. 7, and after, FIG. 8, putting the elastic material into compression, this putting into compression being achieved by increasing the length of the midline of the cross section of the inner sleeve.
Figure 8:
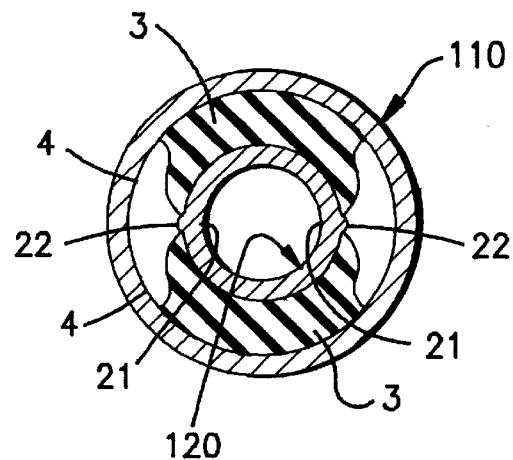

FIGS. 7 and 8 represent a variant of an elastic support according to the invention in which the rubber 3 is put into compression not by a reduction in the length of the midline of the cross section of the outer sleeve 110 but by an increase in that of the inner sleeve 120. To do this, the process starts with an inner sleeve 120 including, in FIG. 7, projecting longitudinal folds 121 uniformly distributed on the periphery; according to the example shown, the inner sleeve 120 includes two projecting folds 121 disposed at one hundred and eighty degrees. As for the previous variants, such an inner sleeve 120 and a cylindrical outer sleeve 110 having a circular cross section are placed coaxially in a molding machine, blanked-off areas 240 being provided: as may be seen in FIG. 7, these blanked-off areas 240 are disposed in line with the projecting folds 121 of the inner sleeve 120. Thus, the rubber 3 after molding adheres by adhesive bonding to the regions other than the regions 22 of the external surface of the inner sleeve 120, these regions being located in line with the projecting folds 121, a layer of adhesive 4, as previously, having being sprayed beforehand onto the internal surface of the outer sleeve 110 and the external surface of the inner sleeve 120. The blanked-off areas 240 are such that there is no rubber bonded in the regions 22 of the external surface of the inner sleeve 120. Next, the inner sleeve 120 is subjected to a tube-expansion operation after which the length of the midline in cross section of the inner sleeve 120 is increased, the projecting folds 121 being opened by this operation, generally leaving longitudinal traces 21 called pushed-out folds 21. The increase in length of the midline during the tube-expansion operation may be as high as twenty percent, without deterioration of the bonding, the material of the inner sleeve 120 not being subjected to any elongation during the tube-expansion operation.

Figure 9:
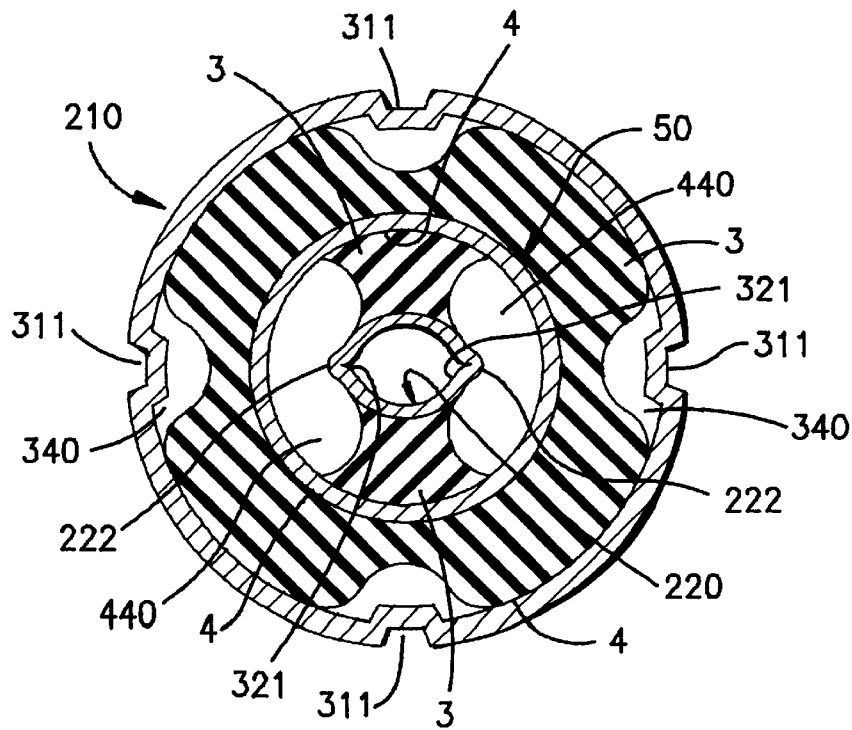
FIG. 9 is a cross-sectional view of an elastic support according to the invention, including an intermediate sleeve, before putting the elastic material into compression.
Figure 10:
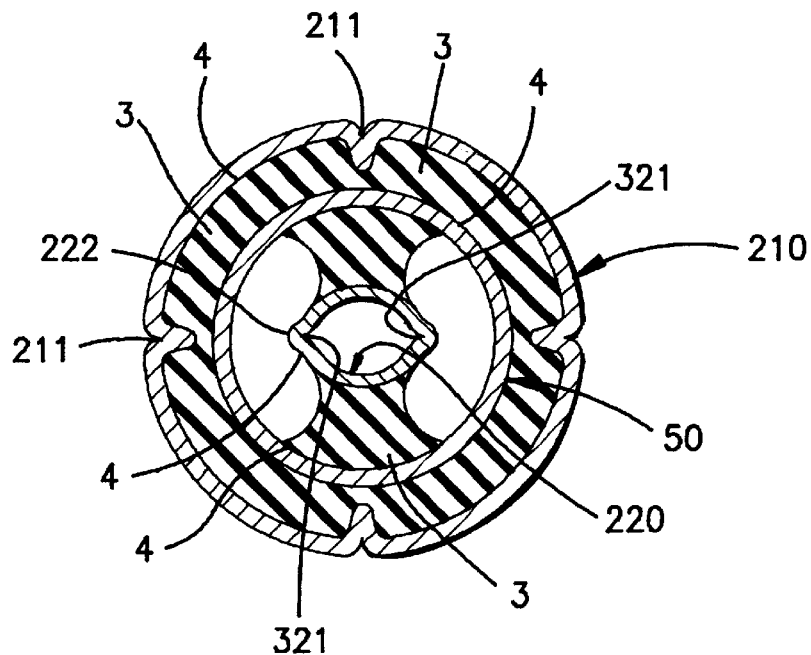
FIG. 10 represents the elastic support of FIG. 9 after putting the elastic sleeve into compression by a first time, by decreasing the length of the midline of the cross section of the outer sleeve.
Figure 11:
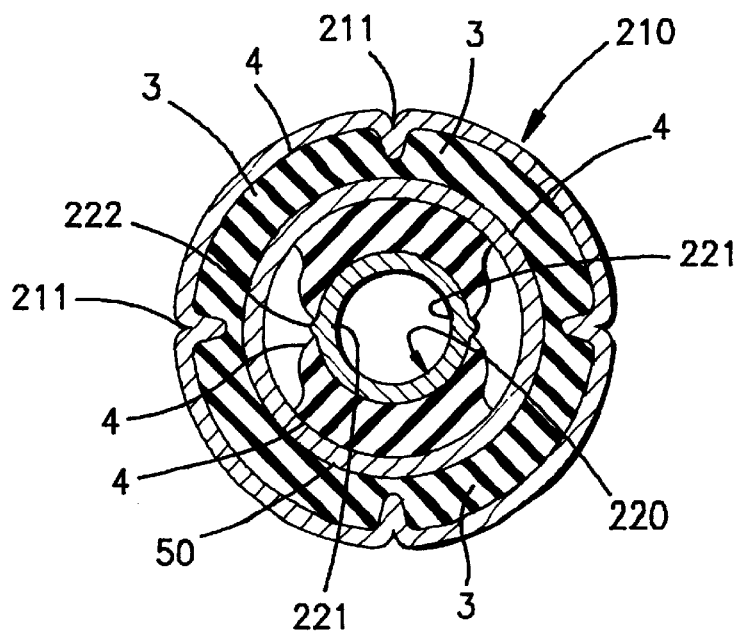
FIG. 11 represents the elastic support of FIG. 10 after putting the elastic material into compression, a second time, by-increasing the length of the midline of the cross section of the inner sleeve.

FIGS. 9 to 11 relate to another variant of an elastic support according to the invention which comprises, in addition to the inner 220 and outer 210 sleeves analogous to those described previously with regard to FIGS. 3 to 8, an intermediate sleeve 50 which has the same axis as the outer 210 and inner 220 sleeves and is placed between them; in these figures, the elements of the sleeves 220 and 210 similar to those of the analogous sleeve of the previous figures bear the references which they had in these figures, but increased by two hundred and will not be described further; some rubber 3 is disposed between, on the one hand, the intermediate sleeve 50 and, on the other hand, each of the outer 210 and inner 220 sleeves. The rubber 3 is bonded to the outer and inner sleeves as in the previous variants, blanked-off areas such as 340 and 440 having been provided and, furthermore, on the internal and external surfaces of the intermediate sleeve 50. In this variant, the rubber 3 is put into compression by reducing the length of the midline of the cross section of the outer sleeve 210 and by increasing that of the inner sleeve 220. FIG. 9 represents this variant of an elastic support just after molding the rubber 3, the outer sleeve 210 being analogous to the outer sleeve 10 described with regard to FIG. 3 and the inner sleeve 220 being analogous to the inner sleeve 120 described with regard to FIG. 7. FIG. 10 shows the configuration of the elastic support after the outer sleeve 210 has passed through a die and FIG. 11 shows the final configuration of the elastic support after the inner sleeve 220 has been subjected to the tube-expansion operation; of course, both these operations, passing through a die and tube expansion, may be carried out in succession or at the same time.

I claim:

1. An elastic support comprising three coaxial cylindrical sleeves, and an elastic material in compression between said sleeves, said sleeves comprising an inner sleeve, an intermediate sleeve and an outer sleeve, said inner sleeve having pushed-out longitudinal folds and said outer sleeve having pushed-in longitudinal folds said folds being uniformly distributed about respective ones of said sleeves, the rigidity of said folds keeping the elastic material in compression.

2. An elastic support as claimed in claim 1, the elastic material being bonded to respective ones of said sleeves only in regions other than those which are located in radial alignment with respective ones of said folds.

3. The support of claim 1, wherein said folds are inherently rigid, and the inherent rigidity of said folds keeps the elastic material in compression.

4. A process for manufacturing an elastic support including three cylindrical coaxial sleeves with an elastic material between said sleeves, comprising forming on an inner one of said sleeves pushed-out longitudinal folds uniformly distributed about said inner sleeve, and forming on an outer one of said sleeves pushed-in longitudinal folds uniformly distributed about said outer sleeve, the rigidity of said folds keeping the elastic material permanently in compression.

5. A process as claimed in claim 4, and providing on said elastic material longitudinally extending recesses prior to forming said longitudinal folds, and forming said longitudinal folds in positions such that said longitudinal folds extend into said longitudinal recesses.

6. A process for manufacturing an elastic support including three cylindrical coaxial sleeves with an elastic material between said sleeves, comprising forming on an inner one of said sleeves pushed-out longitudinal folds uniformly distributed about said inner sleeve, forming on an outer one of said sleeves pushed-in longitudinal folds uniformly distributed about said outer sleeve, providing on said elastic material longitudinally extending voids prior to forming said longitudinal folds, and forming said longitudinal folds in positions such that said longitudinal folds extend into said longitudinal voids.

7. A process as claimed in claim 6, wherein said voids comprise spaces between separate longitudinally extending bodies of said elastic material.

8. A process as claimed in claim 6, wherein said elastic material comprises a single body of elastic material.

* * * * *